(12) United States Patent
Littleford (10) Patent No.: US 11,920,466 B2
(45) Date of Patent: Mar. 5, 2024

(54) DOWNHOLE DETECTION (71) Applicant: Welldata (Subsurface Surveillance Systems) Limited, Fife (GB)

(72) Inventor: Sydney Joseph Littleford, Fife (GB)

(73) Assignee: Welldata (Subsurface Surveillance Systems) Limited, Fife (GB)

( * ) Notice: Subject to any disclaimer, the term of this patent is extended or adjusted under 35 U.S.C. 154(b) by 0 days.

(21) Appl. No.: 16/966,899

(22) PCT Filed: Feb. 7, 2019

(86) PCT No.: PCT/GB2019/050336
§ 371 (c)(1),
(2) Date: Aug. 2, 2020

(87) PCT Pub. No.: WO2019/155218
PCT Pub. Date: Aug. 15, 2019

(65) Prior Publication Data
US 2021/0047919 A1 Feb. 18, 2021

(30) Foreign Application Priority Data

Feb. 8, 2018 (GB) ................................. 1802054
Sep. 10, 2018 (GB) ................................. 1814680

(51) Int. Cl.
*E21B 47/13* (2012.01)
*E21B 33/068* (2006.01)
*E21B 47/047* (2012.01)
*G01F 23/284* (2006.01)

(52) U.S. Cl.
CPC ............ *E21B 47/13* (2020.05); *E21B 33/068* (2013.01); *E21B 47/047* (2020.05); *G01F 23/284* (2013.01)

(58) Field of Classification Search
CPC .......... E21B 47/13; E21B 47/04; E21B 47/047
See application file for complete search history.

(56) References Cited

U.S. PATENT DOCUMENTS

| 1,555,802 A | 9/1925 | Huber |
| 2001/0050172 A1* | 12/2001 | Tolman ................. E21B 17/203 166/297 |
| 2007/0040557 A1 | 2/2007 | Johnstad et al. |
| 2014/0124210 A1* | 5/2014 | Dowell ................. G01F 23/284 166/336 |

(Continued)

FOREIGN PATENT DOCUMENTS

| GB | 2535278 A | 8/2016 |
| WO | 2014/199179 A2 | 12/2014 |

OTHER PUBLICATIONS

International Search Report and Written Opinion of the International Searching Authority, International Application No. PCT/GB2019/050336, dated Jun. 11, 2019, 9 pp.

*Primary Examiner* — Kristyn A Hall
(74) *Attorney, Agent, or Firm* — Myers Bigel, P.A.

(57) ABSTRACT

There is disclosed an apparatus (115) for detecting and/or measuring a downhole feature (195), such as a fluid/fluid interface, in a well (105). The apparatus (115) comprises a first fluid and/or liquid permeable tube (120). The first tube (120) is porous or (micro)perforated. The apparatus (115) comprises a second fluid and/or liquid impermeable tube (130). The first and second tubes (110, 130) are hollow, and therefore, provide first and second waveguides, respectively.

20 Claims, 9 Drawing Sheets (56) References Cited

U.S. PATENT DOCUMENTS

2016/0115784 A1* 4/2016 Littleford ............... E21B 47/13
 324/333
2016/0215612 A1* 7/2016 Morrow ................. E21B 47/01

* cited by examiner

DOWNHOLE DETECTION

RELATED APPLICATIONS

This application is a 35 U.S.C. § 371 national stage application of PCT Application No. PCT/GB2019/050336, filed on Feb. 7, 2019, which claims priority from Great Britain Patent Application No. 1814680.3, filed on Sep. 10, 2018 and Great Britain Patent Application No. 1802054.5, filed on Feb. 8, 2018, the contents of all of which are incorporated herein by reference in their entireties. The above-referenced PCT International Application was published in the English language as International Publication No. WO 2019/155218 A1 on Aug. 15, 2019.

FIELD OF INVENTION

The present invention relates to downhole detection. In particular, though not exclusively, the invention relates to a method, system, apparatus and/or device for downhole detection or for detecting a downhole feature or features in an oil, gas and/or water well, for example, a subsea or offshore well. The method may, for example, find use in detecting one or more fluid interfaces in a completed oil, gas or water well.

BACKGROUND TO INVENTION

It is often desirable to measure a level of one or more fluids within a completed oil, gas and/or water well. The term "completed" is typically understood in the art to refer to a well which has been drilled and which may be sealed and/or capable of production, observation and/or injection, e.g. for "artificial lift". For example, it is often desirable to measure the level or content interface of oil, water and/or gas in such wells. This may be important when controlling flow rates of hydrocarbon fluids through a well from a fluid-bearing (hydrocarbon-bearing) formation surrounding the well and/or when seeking to maximise the efficiency of production of fluids (hydrocarbon fluids) or injection fluids from or into the well. In this regard, it may be important to discriminate between the level of an interface existing between a layer of water and a layer of oil and/or the level of an interface existing between a layer of oil and a layer of gas. This may be useful when seeking to at least partially reduce the production of water to surface or when seeking to control an amount of gas produced in an oil, gas and/or water well for enhanced production of oil. It may also be desirable to measure the level of a fluid within an injection well when injecting a fluid such as water or a gas through the injection well.

It is also known to use a downhole pump in an oil, gas or water well to provide so-called artificial lift of fluids such as hydrocarbon fluids or water to surface. If the fluid levels in the well are permitted to fall below the level of a downhole pump, the pump may become susceptible to wear or damage or may malfunction or "burn out". Thus, it may be important to have accurate real-time measurements of fluid levels in an oil, gas or water well relative to a downhole pump.

It is known to use Time and Frequency Domain Reflectometry techniques for detecting a fluid level in a vessel or structure in which an electromagnetic pulse is radiated from a transmitter to an interface between two fluids and a reflection of the electromagnetic pulse from the interface is detected at a receiver. The fluid level detection criteria requires that very short distances of, e.g. 1-2 mm to lengths of e.g. 2 kms, but not limited thereto, need to be covered.

The interface reflection is generally a resultant of the differential of dielectric properties of the structure being measured. It is known that materials such as steel, water, oil, hydrates and scale as well as other materials have different dielectric properties, and as such will reflect an electromagnetic pulse providing an interface or anomaly location measurement. It is also understood that electromagnetic mode changes will occur within the structure being measured, and that particular mode patterns being produced can be advantageous or restrict the measurement process. As an electromagnetic pulse is transmitted through a waveguide it is known that the mode or modes, TEnn, will change until a dominant mode for the structure being scanned is formed. The tubing string and annulus in this instance is forming a waveguide, and as such, known mode formation and stability will occur.

The electromagnetic pulse reflection measurement within the waveguide is obtained from the dielectric reflections as well as from surfaces within the waveguide reflecting energy; it is known that tubing and casing joints, wellhead connections, gate valves and other restrictions, as well as dielectric anomalies, will provide reflections and as such measurement information. Also known is the effects of dispersion on the electromagnetic pulse caused by the surface finish, material selection, surface condition and surface coatings of the tubing or casing inside diameters. The effects of dispersion and dielectric anomalies affect the time taken by the pulse to travel from the transmitter to the interface and back to the receiver, which time provides an indication of the level of fluid in the tank.

WO 2014/199179 (to the present Applicant) discloses a method for detecting a downhole feature in a well, the method comprising: sealing a well; and then transmitting an electromagnetic signal from a first position located substantially at or adjacent to surface through a first space to the downhole feature; and receiving the electromagnetic signal at a second position located substantially at or adjacent to surface after reflection of the electromagnetic signal from the downhole feature and after propagation of the electromagnetic signal through a second space. The first space and the second space can be the same space.

GB 2 535 278 A (to the present Applicant) discloses a structure defining an elongate space, the structure comprising an apparatus installed within the structure, wherein the apparatus comprises or includes: a signal generator and detector arrangement; and at least one antenna coupled to the signal generator and detector arrangement, wherein the at least one antenna is coupled to the elongate space for transmitting an electromagnetic signal into the elongate space and for receiving the electromagnetic signal from the elongate space after reflection of the electromagnetic signal from a feature within the elongate space.

It is an object of at least one embodiment of at least one aspect of the present invention to obviate and/or mitigate one or more problems or disadvantages in the prior art.

A method of reducing the above-mentioned effects may be implemented by one or more embodiments of the present invention. For down the tubing application, replacing the tubing lengths by running a continuous coil—normally called coiled tubing, will eliminate electromagnetic pulse energy losses as there are fewer connections and the continuous internal surface is of a consistent surface finish and quality thereby reducing dispersion effects. Similarly, by using the same principal in the annulus improved transmission distances and reflections will be obtained. The technique for the annulus use will eliminate the dispersive effects of poor surface finish, scale, cement sheath, surface handling damage, centralizing system and the unstable interfaces normally associated in the annulus with multi liquid/gas flow regimes such as mist flow or foaming. Both of such can prevent a definitive measurement being made.

SUMMARY OF INVENTION

According to a first aspect of the present invention there is provided an apparatus or system, for example, for detecting and/or measuring a downhole feature in a well or borehole, the apparatus comprising a or at least one first, fluid and/or liquid permeable, tube or tubing.

The well may be an oil, gas and/or water well. The well may be a production, observation and/or injection well. The well may be a disposal well, e.g. a waste disposal well such as a nuclear waste disposal well. The first tube may advantageously be porous or perforated.

The first tube may comprise an at least partially porous or perforated wall or side wall, e.g. comprising a plurality of pores, micropores, holes or slots. The first tube may comprise a polymeric or plastics material. Alternatively, the first tube may comprise a metallic material.

The apparatus or system may further comprise a or at least one second, fluid and/or liquid impermeable, tube or tubing.

The second tube may comprise a solid or non-porous or non-perforated side wall. The second tube may advantageously comprise a polymeric or plastics material. Alternatively, the second tube may comprise a metallic material.

An end, e.g. an upper end, of the one or more first tube(s) may be (fluidically and/or transmittably) attached to or connected, e.g. either directly or indirectly, to an end, e.g. lower end, of the or one of the second tube(s). The first tube may comprise a downstream tube. The second tube may comprise an upstream tube.

The first and/or the second tubes may be hollow. The first and/or second tubes may provide respective first and second waveguides.

The first and/or second tubes may be reelable or spoolable, e.g. may comprise coiled tubing.

The first and second tubes may be (fluidically) connected via a connector.

The first tube may comprise a first waveguide.

The second tube may comprise a second waveguide.

The connector may comprise a further waveguide.

The first tube may have a substantially circular cross-section, e.g. at least internal cross-section.

The second tube may have substantially circular cross-section, e.g. at least internal cross-section.

In use, the first tube may be provided downhole of the second tube.

In use, the second tube may extend substantially from or through a wellhead or Christmas tree.

In use, the apparatus may be provided in a wellbore of the well, beneficially in an annulus between a wellbore casing and production tubing.

In use, an electromagnetic signal, e.g. microwave signal, may be propagated within the second tube to within the first tube.

In use, a partial reflection of the electromagnetic signal may occur at the connector or joint between the respective first and second tubes. This may be beneficial in providing a reference level or datum point—as a length of the second tube may be known.

The apparatus or system may further provide an electromagnetic (e.g. microwave, millimetre or radio) antenna which may be connected to another end of the second tube.

The electromagnetic antenna may comprise a transmitter. The electromagnetic (e.g. microwave, millimeter or radio antenna) may comprise a receiver.

The electromagnetic (e.g. microwave antenna (e.g. transmitter and/or receiver) may be provided external of the wellhead and/or Christmas tree. In use, in a transmission path, an electromagnetic signal may propagate from the transmitter through the second tube. The second tube may extend from the antenna or transmitter through the wellhead and/or the Christmas tree. In said transmission path, the electromagnetic signal may propagate through the connector. In said transmission path the electromagnetic signal may propagate through the first tube, e.g. until a fluid/liquid interface(s) is met. At said fluid/liquid interface(s) the electromagnetic signal may be at least partially reflected. The reflected electromagnetic signal(s) may then propagate through the first tube, the connector, and/or the second tube in a received, return, and/or reverse path. The reflected signal(s) may be received by the antenna or receiver.

In this way the apparatus/system may be used to determine a depth of a fluid interface(s) within a wellbore of the well, e.g. by determining the time taken for the electromagnetic signal to be transmitted then received.

The electromagnetic signal may beneficially comprise a microwave signal, or alternatively a millimetre or radio signal. The electromagnetic signal may have a frequency or frequencies within a range of 1 MHz to 100 MHz, 1 MHz to 1 GHz, 1 GHz to 100 GHz, e.g. 1 GHz to 50 GHz, e.g. 4 GHz to 40 GHz or 20 GHz to 70 GHz. The electromagnetic signal may comprise a TE-nn, TEnn mode or other mode, e.g. TE-01, TE01 such as TEMnn to suit the specific measurement requirement.

According to a second aspect of the present invention there is provided a well, such as an oil/gas/water/disposal well, comprising an apparatus or system according to the first aspect of the present invention.

The well may be a production well.

The well may be an injection/artificial lift well.

The well may comprise a completed/sealed well.

The well may comprise a wellbore casing.

The well may comprise a production tubing.

The well may comprise a wellhead.

The well may comprise a Christmas tree.

The well may be a disposal well.

The second tube may extend through the wellhead/Christmas tree, e.g. through a port in the Christmas tree. The second tube may also act as a second production or injection conduit.

The apparatus or system may extend within the well, e.g. in an annulus between a the wellbore casing and a/the production tubing.

According to a third aspect of the present invention there is provided a tube or tubing adapted to comprise a first tube or tubing of the apparatus or system of the first aspect of the present invention.

According to a fourth aspect of the present invention there is provided a tube or tubing adapted to comprise a second tube or tubing of the apparatus or system of the first aspect of the present invention.

The first tube and/or second tube may comprise coiled, coilable, reelable or spoolable tubing.

According to a fifth aspect of the present invention there is provided a method of detecting at least one downhole feature in a well, such as a oil/gas/water well, the method comprises:

providing an apparatus or system according to the first aspect within a wellbore of the well;

transmitting (e.g. from a transmitter) an electromagnetic signal within (e.g. down) the apparatus or system;

reflecting at least part of the electromagnetic signal from the feature (e.g. interface, such as a fluid and/or liquid interface);

receiving the at least part of the electromagnetic signal (e.g. at a receiver).

The transmitter and the receiver may be provided external of the wellbore.

The downhole feature may comprise a fluid/fluid interface, e.g. gas/liquid, liquid/liquid interface.

The method may comprise the step of sealing the well, preferably prior to the step of transmitting the electromagnetic signal.

BRIEF DESCRIPTION OF DRAWINGS

Embodiments of the present invention will now be described by way of example only, with reference to the accompanying drawings, which are.

DETAILED DESCRIPTION OF DRAWINGS

Figure 1:
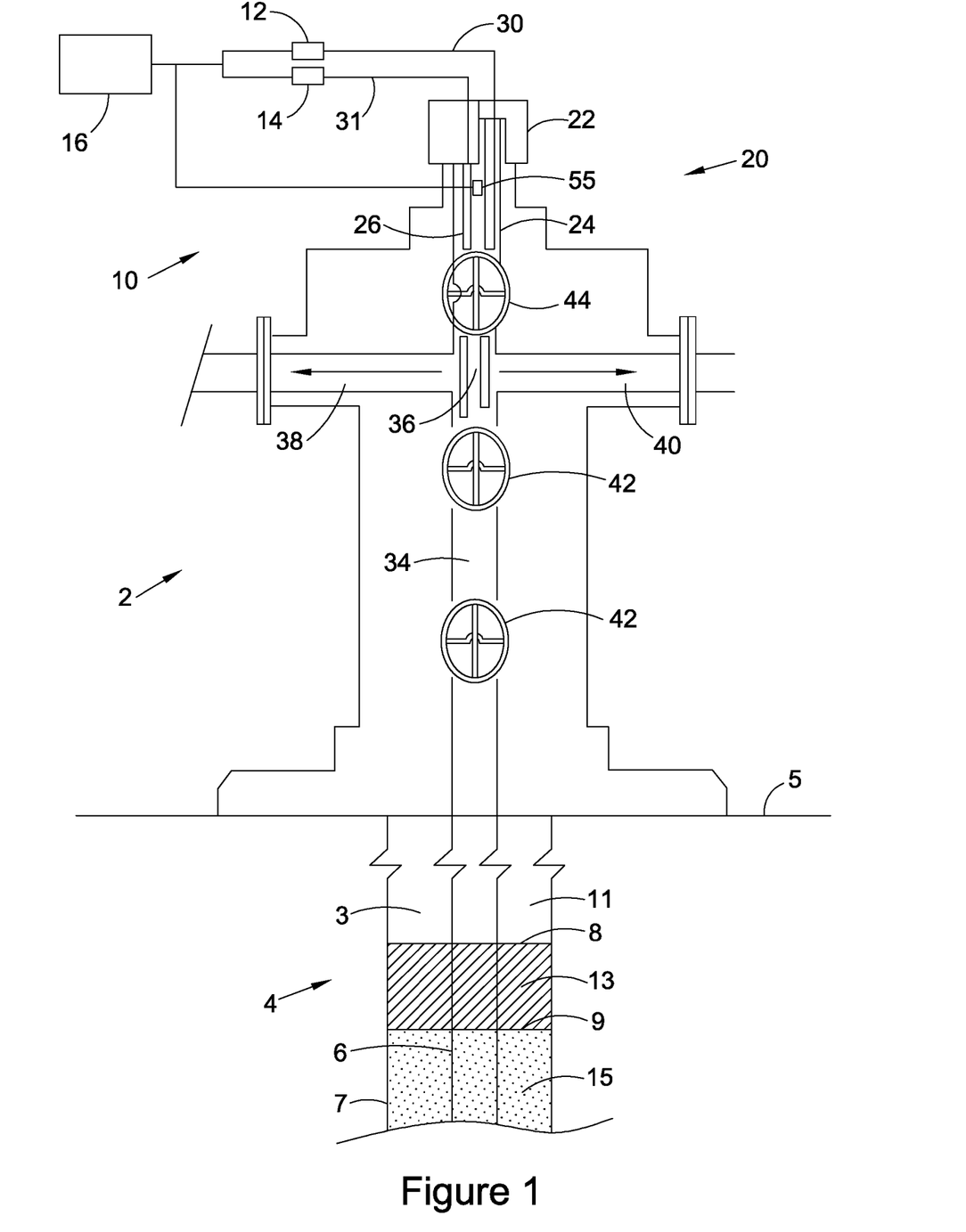
FIG. 1 a schematic view of a Christmas tree at a head of an oil, gas or water well according to the prior art, including a first system for detecting a downhole feature in the well.

Referring initially to FIG. 1, there is shown a Christmas tree, generally designated 2, according to the prior art, and as disclosed in WO 2014/199179 A2 (to the present Applicant). The Christmas tree is located at a head of an oil, gas and/or water well, generally designated 4, which extends downwardly from surface 5. The Christmas tree 2 can be a subsea tree or a surface tree and, as such, surface 5 can represent a seabed or ground level, respectively. The well 4 includes production tubing 6 centrally located within a casing 7. An annulus 3 is defined between the production tubing 6 and the casing 7. A first feature in the form of a first fluid interface 8 is located downhole in the well 4 between a first fluid 11 and a second fluid 13. A second feature in the form of a second fluid interface 9 is located downhole in the well 4 between the second fluid 13 and a third fluid 15. As shown in FIG. 1, the second fluid interface 9 is located in the well 4 x downhole of, e.g. below, the first fluid interface 8. The first fluid 11 can be a gas such a hydrocarbon gas or a mixture of gases. The first fluid 11 can be air. The second fluid 13 can be oil. The third fluid 15 can be water. The first fluid interface 8 can be a gas-oil interface. The second fluid interface 9 can be an oil-water interface.

The Christmas tree 2 includes a system, generally designated 10, for detecting a downhole feature(s) located downhole in the well 4, such as the first and second fluid interfaces 8, 9. The system 10 comprises a transmitter 12, a receiver 14 and a controller 16. As indicated by the dotted lines in FIG. 1, the controller 16 is configured for communication with the transmitter 12 and the receiver 14. The system 20 10 comprises a cap arrangement, generally designated 20, which includes a cap member 22, and transmitter and receiver antennas 24, 26, respectively, extending downwardly from the cap member 22. The system 10 further comprises a first electrical conductor 30 which extends through the cap portion 22 and connects the transmitter 12 to the transmitter antenna 24, and a second electrical conductor 31 which extends through the cap member 22 and connects the receiver antenna 26 to the receiver 14.

Figure 2:
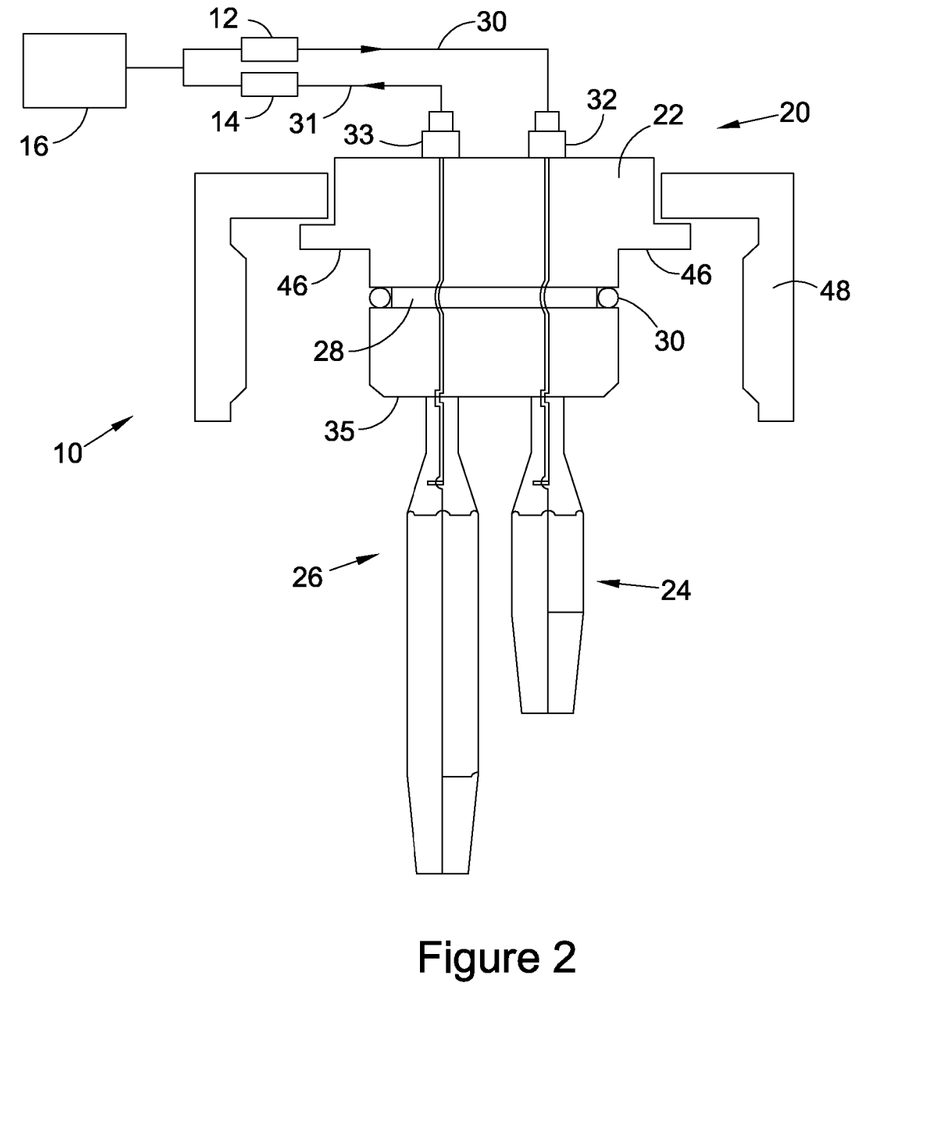
FIG. 2 a schematic view of the system of FIG. 1 in isolation from the Christmas tree.

The system 10 is shown in more detail in FIG. 2. The first and second electrical conductors 30, 31 are sealed relative to the cap member 22 via cable glands 32, 33. The cap member 22 defines an annular groove 28 in an outer diameter thereof. The cap member 22 further includes an O-ring 30 which is accommodated in the annular groove 28.

The transmitter and receiver antennas 24, 26 are modified horn antennas which extend downwardly from a lower surface 35 of the cap member 22 into a through-bore 34 of the Christmas tree 2. As shown most clearly in FIG. 2, the receiver antenna 26 extends downwardly into the through-bore 34 further than the transmitter antenna 24. This may serve to ensure that a return electromagnetic signal propagating upwardly through the through-bore 34 encounters and is received by the receiver antenna 26 before the return electromagnetic signal is incident upon the transmitter antenna 24. This may serve to reduce or suppress noise on the received signal caused by any distortion or spurious reflections of the return electromagnetic signal that may otherwise occur from the transmitter antenna 24.

With reference to FIG. 1, once the cap arrangement 20 is fitted to the Christmas tree 2, each of the transmitter and receiver antennas 24, 26 extend downwardly past a junction 36 between the through-bore 34 and flow and kill paths 38 and 40, respectfully, which extend laterally from the through-bore 34.

To fit the cap arrangement 20 to the Christmas tree 2, one or both of valves 42 are first closed so as to isolate a portion of the throughbore 34 above the valves 42 from well pressure. Subsequently, the valve 44 can open and the transmitter and receiver antennas 24, 26 can be inserted into the through-bore 34 of the Christmas tree 2 past the valve 44 to a depth below the flow and kill paths 38, 40 until the O-ring 30 engages the through-bore 34 and forms a seal therewith and a shoulder or flange 46 of the cap member 22 shown in FIG. 2 engages an upper surface (not shown) of the Christmas tree 2. A locking member 48, shown in FIG. 2, is screw coupled to the Christmas tree 2 to lock the cap member 22 in place relative to the Christmas tree 2.

In use, the transmitter 12 transmits a radio frequency electrical signal to the transmitter antenna 24. The frequency of the electrical signal is varied sequentially in the range 4 to 40 GHz. Typically, the transmitter 12 sequentially transmits 10,000 or more different radio frequencies in the range 4 to 40 GHz to the transmitter antenna 24. The transmitter antenna 24 couples the transmitted electrical signal to a guided TE-nn mode in the through-bore 34. The TE-nn mode propagates through a space defined within the production tubing 6 to the first and second fluid interfaces 8, 9. At least a portion(s) of the electromagnetic signal incident upon the first and second fluid interfaces 8, 9 is/are reflected from the first and second fluid interfaces 8, 9 and propagates as (a) guided TE-nn mode back up through the space defined within the production tubing 7 and the through-bore 34 to the receiver antenna 26. The receiver antenna 26 couples the return electromagnetic signal(s) to a return electrical signal which propagates along the second electrical conductor 31 to the receiver 14.

Figure 3:
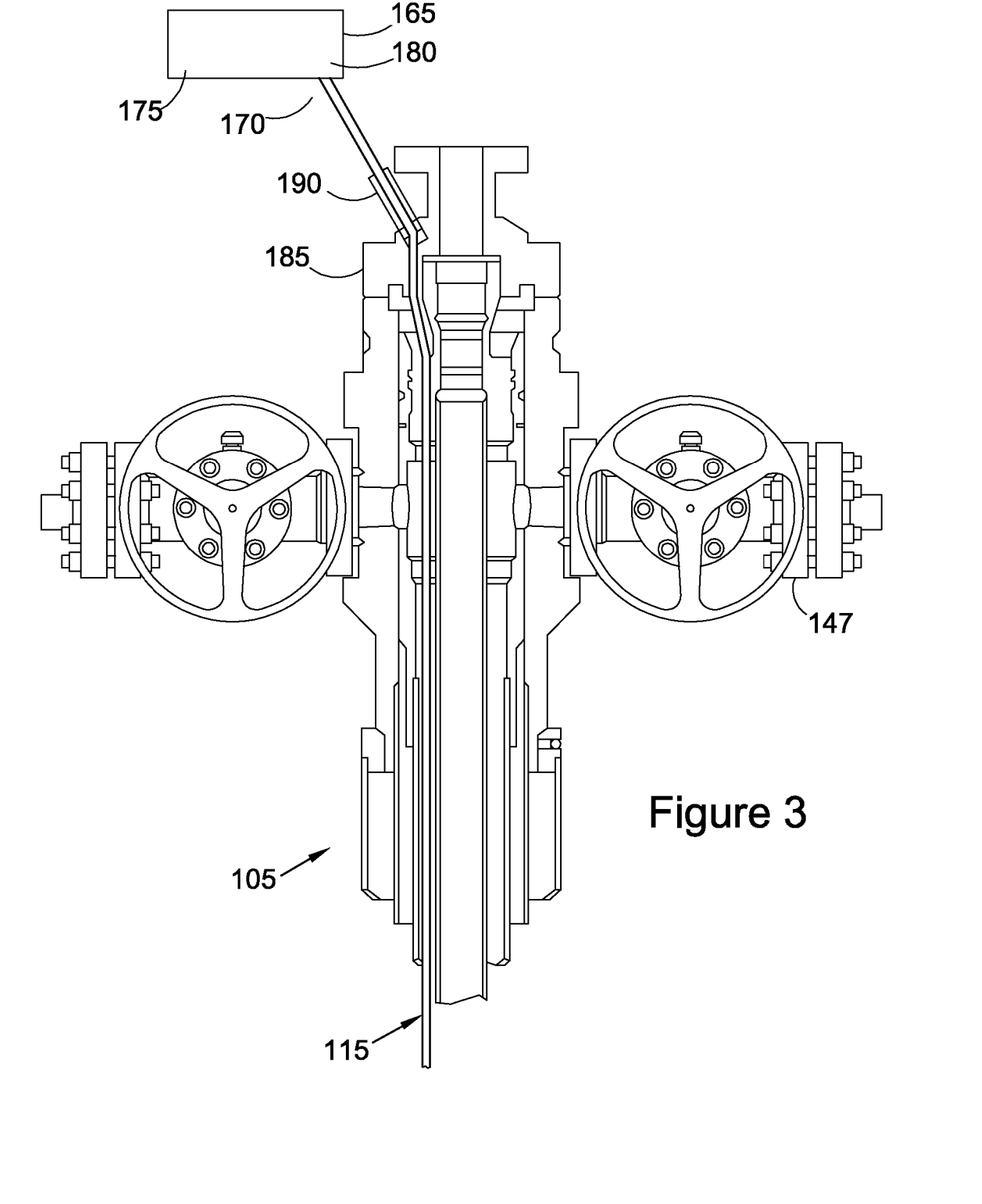
FIG. 3 a wellhead having detection apparatus according to a first embodiment of the present invention.
Figure 4:
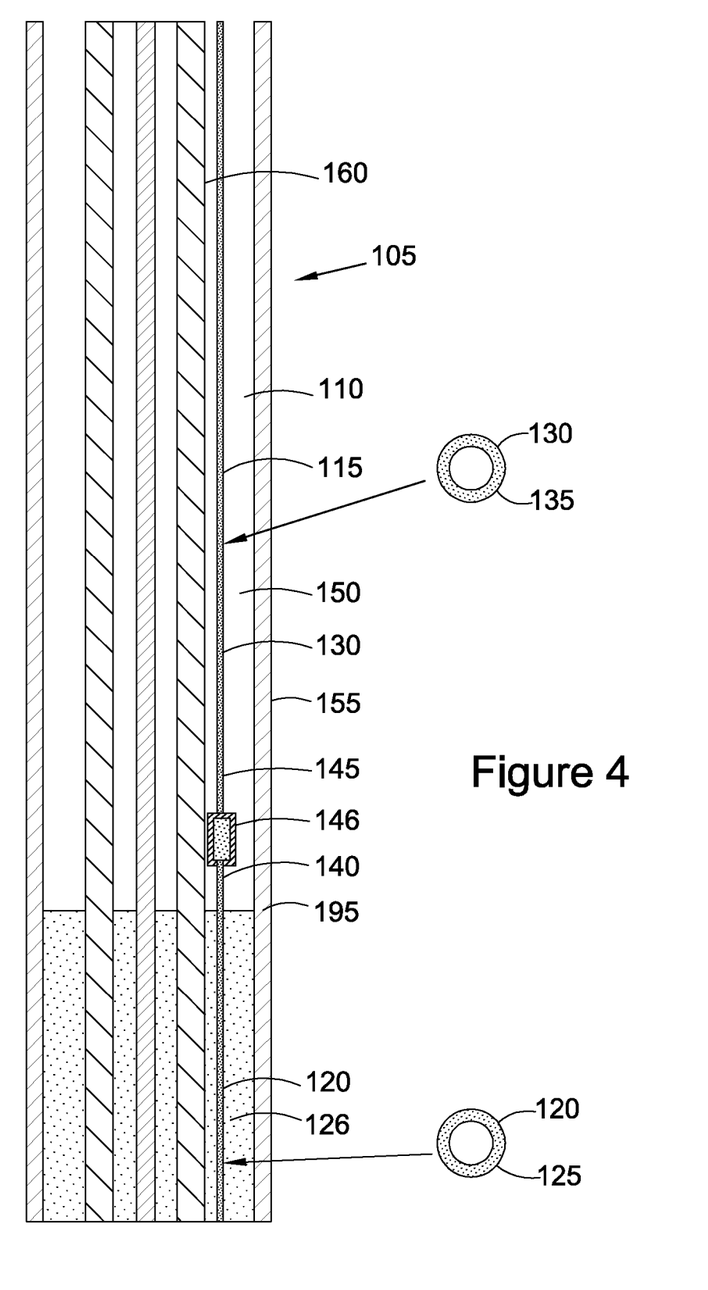
FIG. 4 a wellbore extending from the wellhead of FIG. 3 and having a detection apparatus according to the first embodiment of the present invention.

Referring next to FIGS. 3 and 4, there is shown a well, such as an oil/gas/water well, generally designated 105, comprising a wellbore or borehole 110 comprising an apparatus or system 115, according to a first embodiment of the present invention, for detecting and/or measuring a or at least one downhole feature(s) in the well 105. In this example, the well 105 is capable of production and/or fluid injection for the purposes of artificial lift.

The apparatus 115 comprises a first, fluid and/or liquid permeable, tube or tubing 120. The well 105 is an oil/gas/water well.

The first tube 120 is porous or perforated. The first tube 120 comprises an at least partially porous or perforated side wall 125, e.g. comprising a plurality of pores, micropores, holes or slots 126 (shown schematically in FIG. 4 to an enlarged scale). The first tube advantageously comprises a polymeric or plastics material or can alternatively a metallic material.

The apparatus 115 or system further comprises a second, fluid and/or liquid 10 impermeable, tube or tubing 130. The second tube 130 comprises a solid or non-porous or non-perforated side wall 135. The second tube 130 advantageously comprises a polymeric or plastics material, or can alternatively comprise a metallic material.

An end 140, e.g. upper end, of the first tube 120 is (fluidically) and/or transmissably attached to or connected to an end 145, e.g. lower end, of the second tube 130. The first and/or the second tubes 120, 130 are hollow. The first and/or second tubes 120, 130, therefore, provide respective first and second waveguides.

The first and/or second tubes 120, 130 are typically reelable or spoolable. The first and/or second tube 120, 130 can be run in sections. In this embodiment the first and second tubes 120, 130 are (fluidically) connected via a connector 146. The first tube 120 comprises a first waveguide. The second tube 130 comprises a second waveguide. The connector 146 comprises a further waveguide. In this embodiment the first tube 120 has a substantially circular cross-section, e.g. at least internal cross-section. Also, in this embodiment the second tube 130 has a substantially circular cross-section, e.g. at least internal cross-section.

In use, the first tube 120 is provided downhole (upstream) of the second tube 130. In use, the second tube 130 extends substantially from or through a wellhead 147. In use, the apparatus 115 is provided in the wellbore 110 of the well 105, beneficially in an annulus 150 between a wellbore casing 155 and production tubing 160.

In use, an electromagnetic signal—beneficially a microwave signal or alternatively a millimetre or radio frequency signal—is launched into and propagated within the second tube 130 to within the first tube 120.

In use, a partial reflection of the electromagnetic signal occurs at the connector 146. This advantageously provides a reference level or datum point as a length/depth of the second tube 130 is known.

The apparatus 115 provides an electromagnetic (microwave) antenna 165 which is connected to another (e.g. uphole/downstream) end 170 of the second tube 130. The electromagnetic (microwave) antenna 165 comprises a transmitter 175. The electromagnetic (microwave) antenna 165 further comprises a receiver 180. The electromagnetic antenna 165 (transmitter and/or receiver 175, 180) is beneficially provided external of the well 105, wellhead 145 and/or Christmas tree 185.

In use, in a transmission path, an electromagnetic signal is launched by and propagates from the transmitter 175 through the second tube 130. The second tube 130 extends through the wellhead 145 and/or a port 190 of the Christmas tree 185. In said transmission path, the electromagnetic signal propagates through the connector 140. In said transmission path, the electromagnetic signal propagates through the first tube 120, e.g. until a fluid/liquid interface(s) 195 is met. At said fluid/liquid interface 195 the electromagnetic signal is at least partially reflected. In a received, return, and/or reverse path, the reflected electromagnetic signal then propagates through the first tube 120, the connector 140, and/or the second tube 130. The reflected signal is received by the receiver 180.

In this way the apparatus/system 115 can be used to determine or establish a depth of the fluid interface(s) 195 within the wellbore 110 of the well 105, e.g. by detecting a transmission time of the signal from the transmitter 175 to the receiver 180.

The electromagnetic signal beneficially comprises a microwave signal or alternatively a millimetre or radio signal. The electromagnetic signal typically has a frequency or frequencies within a range of 1 GHz to 100 GHz, e.g. 2 GHz to 50 GHz, e.g. 4 GHz to 40 GHz or 20 GHz to 60 GHz. Beneficially the electromagnetic signal propagates in a TE-nn mode.

The apparatus 115 can comprise a valve or seal for sealing the well 105. The apparatus 115 can comprise completion infrastructure in the well 105 and/or at a head of the well 105, e.g. a Christmas tree 185 at a head of the well 105.

The apparatus 115 can comprise a controller (not shown) for determining a distance between surface and the downhole feature 195 from the electromagnetic signal as transmitted and received.

The apparatus 115 can comprise a cap arrangement which can be configured for sealing an opening of a wellhead device or an opening of wellhead infrastructure located at or adjacent a head of the well 105, whilst also permitting transmission of electrical signals between an environment external to the well 105 and the transmitter 175 and receiver 180 antennas when located within the well 105.

The opening cap can comprise a main bore or a side port of the wellhead device or the wellhead infrastructure. The cap arrangement can be configured to be attached to the wellhead device or the wellhead infrastructure. The cap member can at least partially define and/or comprise a flange or a tubing hanger.

The present invention provides a well 105, such as an oil/gas/water well, comprising an apparatus 115 as hereinbefore described. The well 105 typically and advantageously comprises a completed/sealed well, e.g. pressurised well.

The well 105 comprises wellbore casing 155. The well 105 comprises a production tubing 160. The well 105 comprises a wellhead 145 having a Christmas tree 185. The second tube 130 extends through the Christmas tree 185, e.g. through a port 190 in the Christmas tree 185. Typically the apparatus 115 extends within the well 105, e.g. in annulus 150 between the wellbore casing 155 and the production tubing 160.

The present invention provides a tube or tubing adapted to comprise a first tube or tubing 120 of the apparatus 115 hereinbefore described. The present invention provides a tube or tubing adapted to comprise a second tube or tubing 130 of the apparatus 105 hereinbefore described.

The present invention provides a method of detecting at least one downhole feature, e.g. fluid/fluid (e.g. gas/liquid) interface 195 in a well, such as an oil/gas/water well, the method comprising:
providing an apparatus 105 within a wellbore 110;
transmitting, e.g. from transmitter 175, an electromagnetic signal within (down) the apparatus 105;
reflecting at least part of the electromagnetic signal from the at least one feature interface 195;
receiving the at least part of the electromagnetic signal, e.g. at receiver 180.

The transmitter 175 and the receiver 180 are beneficially provided external (downstream) of the wellbore 110.

The downhole feature 195 typically comprises a fluid/fluid interface, e.g. gas/liquid, liquid/liquid interface.

The method beneficially comprises the preceding step of sealing the well 105 prior to transmitting the electromagnetic signal. The method comprises installing completion infrastructure in the well 105 and/or at a head of the well or wellhead before transmitting the electromagnetic signal. The method comprises installing a valve 35 or valve arrangement at a head of the well or wellhead before transmitting the electromagnetic signal. The method comprises installing a Christmas tree 185 at a head of the well 105 or wellhead before transmitting the electromagnetic signal.

Advantageously, the method comprises pressurising the well 105 before transmitting the electromagnetic signal. The method advantageously comprises a negative pressure being present in the well before transmitting the electromagnetic signal.

The method can comprise exposing the well 105 to a fluid pressure existing within a sub-surface formation located adjacent to the well 105 before transmitting the electromagnetic signal. The method can comprise producing a fluid from the well 105 before, during and/or after transmitting the electromagnetic signal. The method can comprise injecting a fluid into the well 105 before, during and/or after transmitting the electromagnetic signal.

The well 105 can comprise a completed oil, gas and/or water well. The well 105 can be configured for production, injection, observation and/or disposal of oil, gas and/or water.

The method can comprise determining a distance between surface and the downhole feature 195 from the electromagnetic signal as transmitted and the electromagnetic signal as received. The method can comprise determining a rate of change of distance between surface and the downhole feature from the electromagnetic signal as transmitted and the electromagnetic signal as received.

The downhole feature 195 is typically spatially localised within the well 105. The downhole feature 195 can comprise a fluid interface including a gas-liquid interface, a gas-gas interface or a liquid-liquid interface. The downhole feature 195 can comprise a gas-oil interface, an oil-water interface or a gas-water interface.

The method can beneficially comprise repeatedly determining a distance between surface and a/the fluid interface so as to permit real-time or dynamic measurements of a level of a/the fluid interface.

The method can comprise controlling a downhole device, a downhole pump, a gas-lift pump or an Electric Submersible Pump (ESP) according to a determined distance between surface and the fluid interface.

The method can comprise using a determined distance between surface and a fluid interface, a known pressure at surface within the well 105, and a known specific gravity of any fluids located between surface and the fluid interface to determine a pressure at the fluid interface.

The downhole feature 195 can comprise a fluid/fluid, e.g. gas/liquid or liquid/liquid interface and/or at least one of:
a change in an inner diameter of a downhole tubular;
a change in a wall thickness of a downhole tubular;
a coupling between two downhole tubulars;
at least a part of a downhole tool;
at least a part of a downhole valve;
at least part of a downhole valve member;
a downhole object, obstruction, impairment, restriction, occlusion; particulates, sand, hydrates, wax, scale, corrosion within the well; and
a deposit on a surface of a downhole tubular.

The method can comprise transmitting the electromagnetic signal with a plurality of different frequencies, e.g. at least 10 different frequencies, at least 100 different frequencies, at least 1,000 different frequencies, or at least 10,000 different frequencies.

The method can comprise sequentially varying a frequency of the electromagnetic signal.

The method can comprise altering the electromagnetic signal as received for each of the different transmitted frequencies to correct or account for any differences in propagation speed of the different frequencies.

The method can comprise:
measuring a magnitude of the electromagnetic signal as received as a function of frequency;
measuring a phase of the electromagnetic signal as received as a function of frequency;
measuring a magnitude of the electromagnetic signal as transmitted as a function of frequency; and/or
measuring a phase of the electromagnetic signal as transmitted as a function of frequency.

The method can comprise:
determining a magnitude frequency spectrum from the magnitude of the electromagnetic signal as received and the magnitude of the electromagnetic signal as transmitted as a function of frequency; and/or
determining a phase frequency spectrum and amplitude from the phase of the electromagnetic signal as received and the phase of the electromagnetic signal as transmitted as a function of frequency.

A Vector Network Analyser (VNA) or reflectometer can be used to determine the amplitude and the phase frequency spectrum.

The method can comprise: determining a time domain reflectance trace from the magnitude frequency spectrum and the phase frequency spectrum; and/or determining a distance between surface and the downhole feature 190 from the time domain reflectance trace. The method can comprise receiving the electromagnetic signal at surface after reflection of the electromagnetic signal from a plurality of downhole features within the well. Each of the downhole features can comprise a different fluid interface.

The method can comprise determining a distance between surface and at least two of a gas-oil interface, an oil-water interface, and a gas-water interface.

Figures 5A, 5B, 5C:
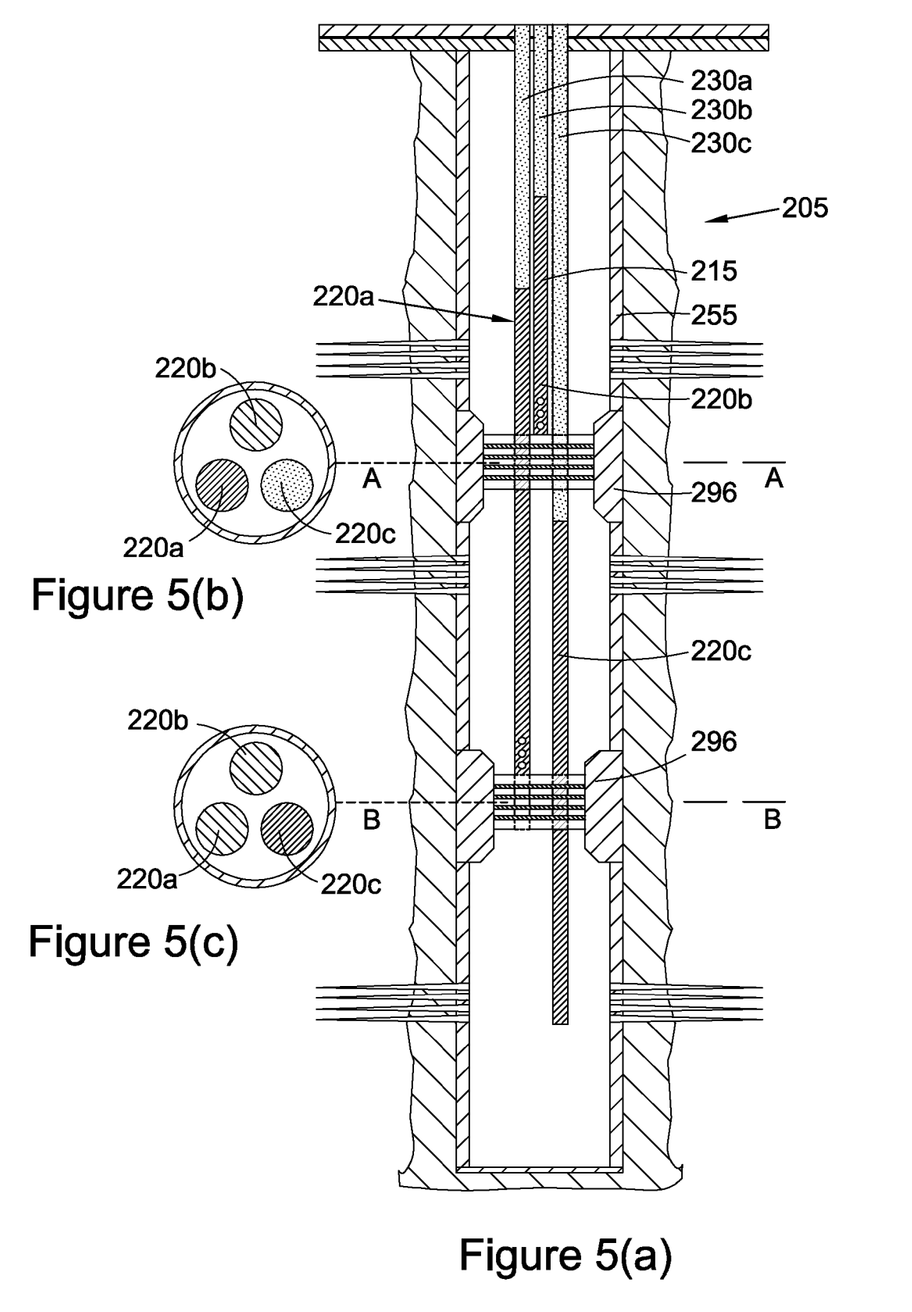
FIG. 5(a) a well having a detection apparatus according to a second embodiment of the present invention.
FIG. 5(b) a cross-section along line A-A of a multi micro-bore tubing string used in the second embodiment of FIG. 5(a)
FIG. 5(c) a cross-section along line B-B of the multi micro-bore tubing string used in the second embodiment of FIG. 5(a)

Referring now to FIGS. 5(a) to (c), there is shown a well 205 having a detection apparatus 215 according to a second embodiment of the present invention. The detection apparatus 215 is similar to the detection apparatus 115 of the first embodiment, like parts being identified by like numerals, but incremented by '100'. The well 205 comprises casing 255.

The detection apparatus 215 comprises a multi microbore tubing or string having a plurality of (in this embodiment three) first tubes 220a, 220b, 220c or "aquifiers". Each first tube 220a, 220b, 220c terminates at a different depth so as to detect a fluid level at a different depth. This arrangement obviates any need to run gangs.

By detecting and measuring fluid levels at a plurality of downhole locations using the multi microbore first tubes 220a, 220b, 220c, one can derive a bottom hole pressure. This arrangement, therefore, provides a relatively low cost and easy access solution to one or more problems in the prior art.

In this embodiment the well 205 is divided into a plurality of (in this embodiment three) zones by a plurality of (in this embodiment two) polished bore receptacles (PBRs) or packers 296.

In this embodiment each of the first tubes 220a, 220b, 220c and second tubes 230a, 230b, 230c comprise coiled tubing (CT).

Figures 6A, 6B, 6C:
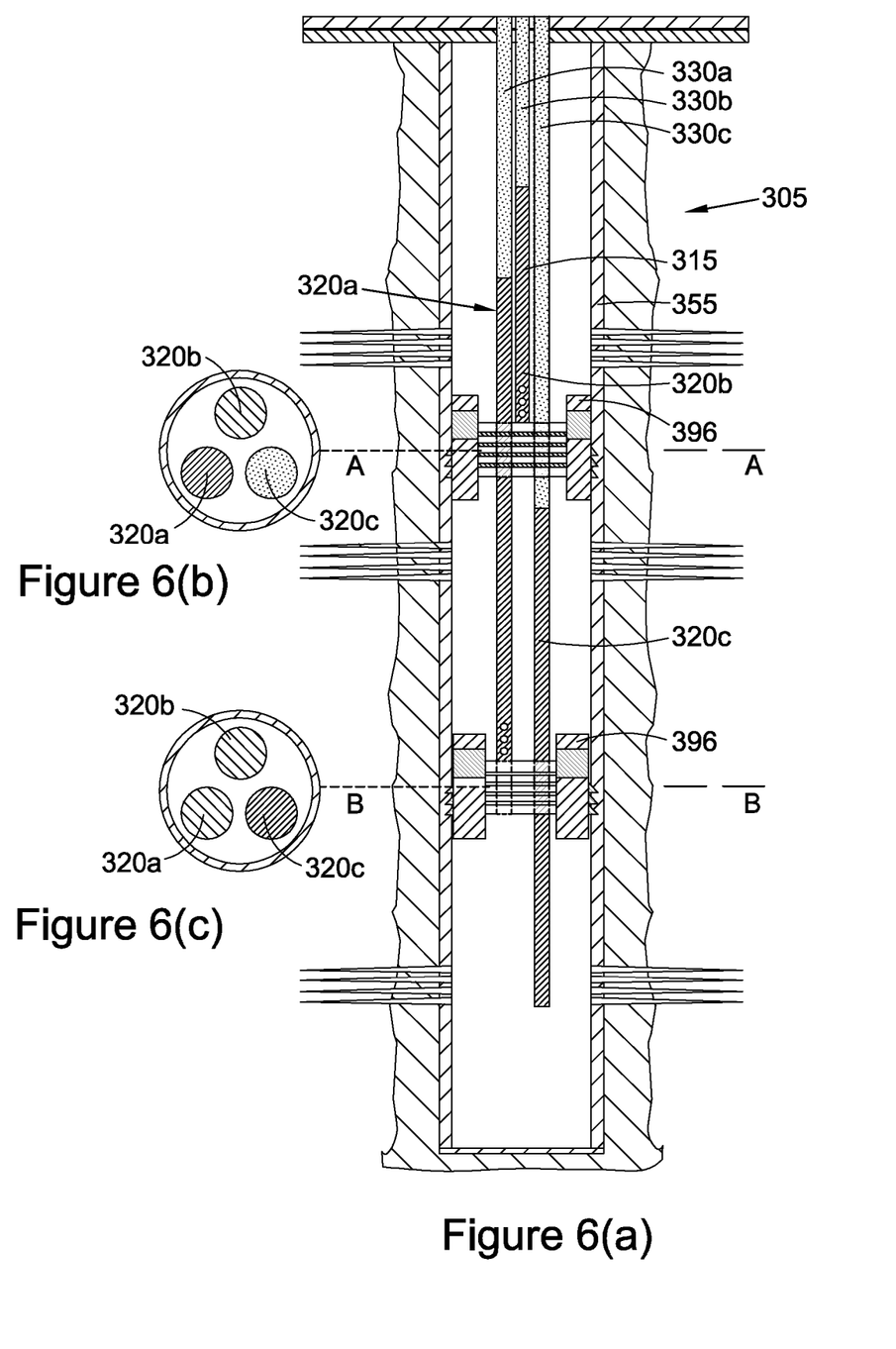
FIG. 6(a) a well having a detection apparatus according to a third embodiment of the present invention.
FIG. 6(b) a cross-section along line A-A of a multi micro-bore tubing string used in the second embodiment of FIG. 6(a)

Referring now to FIGS. 6(a) to (c) there is shown a well 305 having a detection apparatus 315 according to a third embodiment of the present invention. The detection apparatus 315 is similar to the detection apparatus 215 of the second embodiment, like parts being identified by like numbers, but incremented by '100'.

However, in the third embodiment the polished bore receptacles 296 of the second embodiment are replaced by seal bore packers 396.

Figures 7A, 7B, 7C:
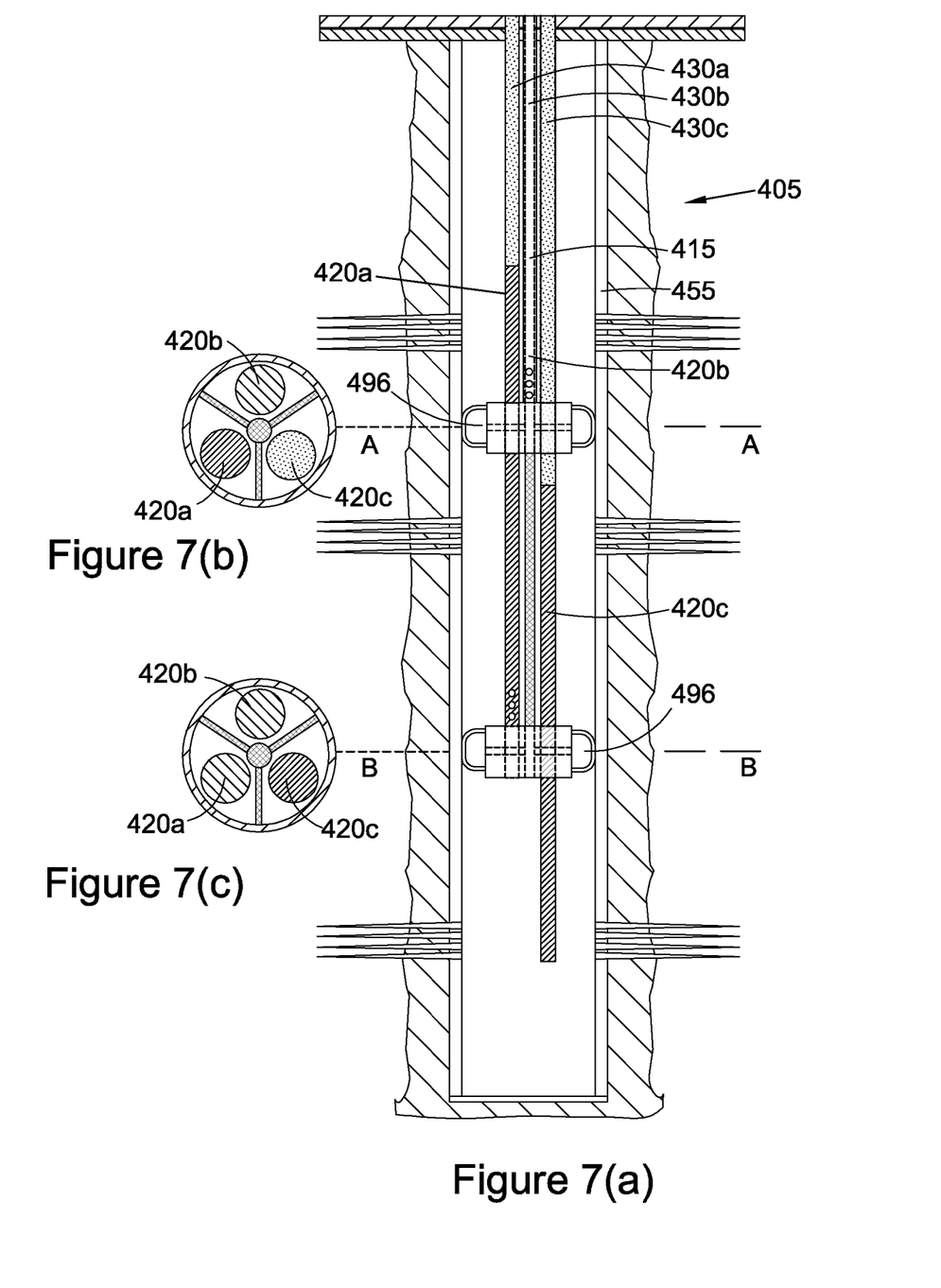
FIG. 7(a) a well having a detection apparatus according to a fourth embodiment of the present invention.
FIG. 7(b) a cross-section along line A-A of a multi micro-bore tubing string used in the third embodiment of FIG. 7(a)
FIG. 7(c) a cross-section along line B-B of a multi micro-bore tubing string used in the third embodiment of FIG. 7(a)

Referring now to FIGS. 7(a) to (c), there is shown a well 405 having a detection apparatus 415 according to a fourth embodiment of the present invention. The detection apparatus 415 is similar to the detection apparatus 215 of the second embodiment, like parts being identified by like numerals, but incremented by 200.

However, in the fourth embodiment the polished bore receptacles 296 of the second embodiment are replaced by inflatable feed-through packers 496.

Figure 8:
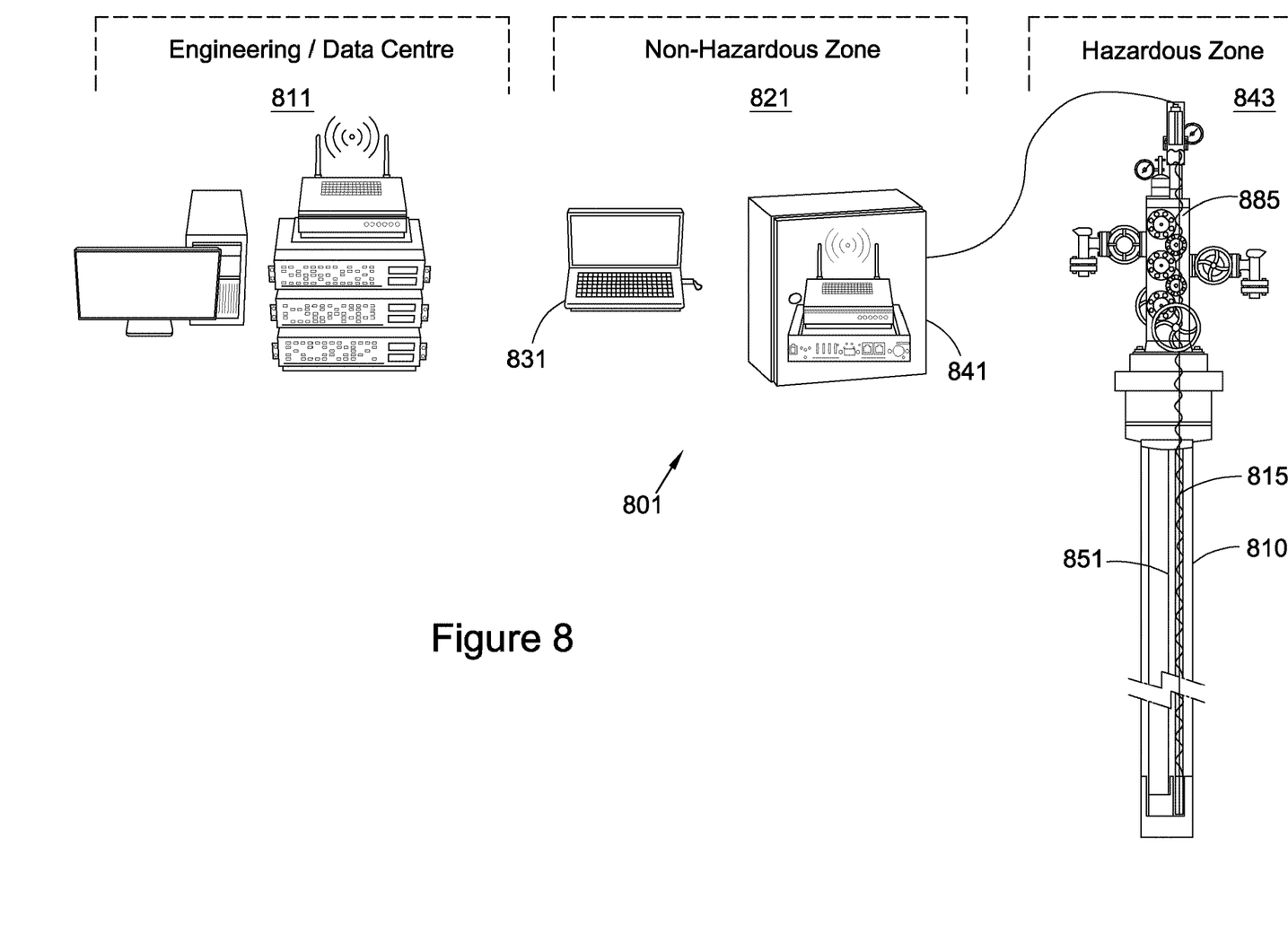
FIG. 8 a schematic diagram of a well monitoring system having a detection apparatus according to any of the aforementioned embodiments of the present invention.

Referring to FIG. 8, there is schematically shown a well monitoring system, generally designated 801, having a detection apparatus 815 according to any of the aforementioned embodiments of the present invention.

The well monitoring system 801 comprises:
an engineering/data centre 811;
a non-hazardous zone 821 comprising a drive-by access 831 and an RTU cabinet installation 841;
a hazardous zone 843 comprising a well 805, a wellhead 885, a borehole 810 having detection apparatus 815 therein as well as a production tubing 851.

The production tubing 851 can have a pump (not shown) associated therewith.

The detection apparatus 815 detects, measures and/or is used to control a (detected) fluid level so as to seek to ensure an associated fluid level does not fall below a necessary level for the pump.

It will be appreciated that by this arrangement a single controller can be multiplexed to a plurality of (in this embodiment three) antenna that feed the respective second tube 830 and first tube 820.

Figure 9:
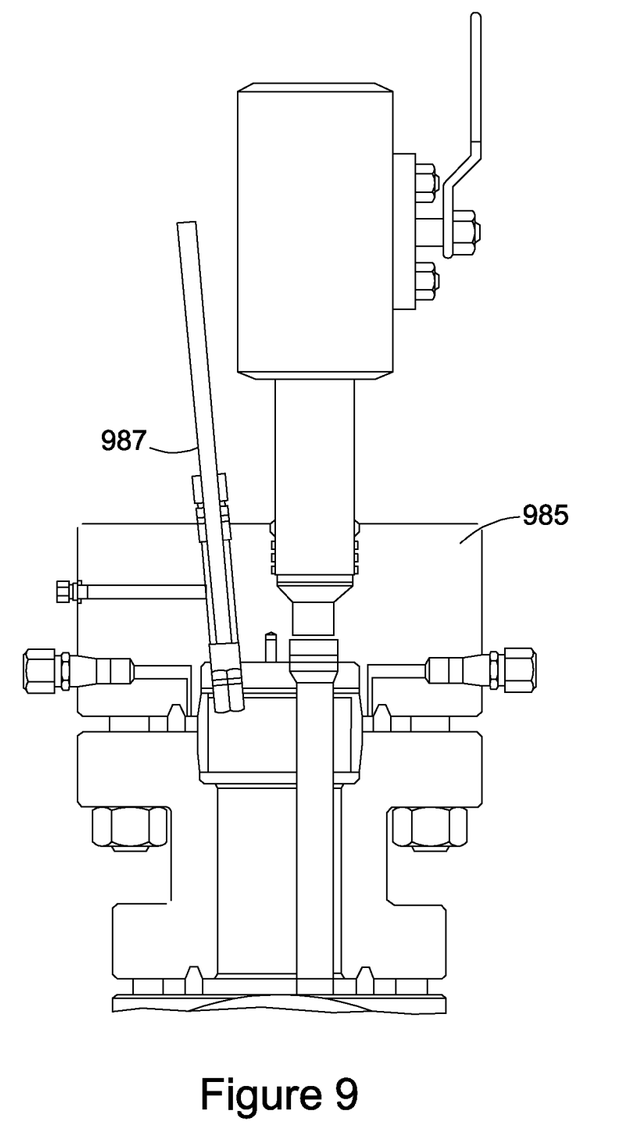
FIG. 9 a wellhead of a well having a detection apparatus according to an of the aforementioned embodiments of the present invention.

Referring to FIG. 9, there is shown a well having a wellhead 985 and a detection apparatus (not shown) according to any of the aforementioned embodiments of the present invention.

The wellhead 985 comprises a feedthrough 987 which allows an electromagnetic (microwave) signal to feedthrough the wellhead 985 from an antenna through a Christmas tree to the detection apparatus 915 comprising microbore tubing.

It will be appreciated that the embodiments of the present invention hereinbefore described are given by way of example only, and are not meant to be limiting of the scope of the invention in any way.

It will be appreciated that an advantage of one or more aspects or embodiments of the present invention is precision of a non-contacting or contactless measuring device, apparatus or system, e.g. for measuring a level of a fluid or liquid, or interface, e.g. in a well or borehole.

The present invention provides a (secondary) conduit. The secondary conduit ("microbore") provides a propagation path replacing the annular geometry of the prior art. Such annular geometry is subject to damage, cement and mud contamination and mechanical irregularities all of which greatly affect the transmission of microwave signals. The present invention also mitigates and/or eliminates any need to keep the tubing and casing fully centralized over the full length of the well. The use of centralisers also contributes to microwave attenuation in the annulus, thereby reducing measurement range. The centralisers act as a water knockout system when wet gas is being produced up the annulus. The water hold-up at the centralisers causes a short circuit, therefore, preventing a microwave signal being transmitted past the short.

Porous microbore is as per solid microbore but with holes or slots cut or otherwise formed therein, the dimensions of which will allow fluid to ingress but also contain microwaves. The annulus fluid level will be measurable through the small bore tube (second tube) as fluid levels will be communicating through annulus into the second tube. The upper and lower microbore can be the same size the entire length or combinations of larger and smaller tubes in any combination and or position. A junction is provided comprising a sealed connection to provide an impedance reflection giving a reference data point.

In one or more embodiments, annulus fluid level will rise and fall due to the subsurface pump rate. The fluid level measurements being taken will control the pump to prevent the fluid level falling below the pump intake, which if such happens can cause catastrophic failures resulting in workers and cessation of production.

In effect one can have microwave signals transmitted down:
1. the tubing;
2. the annulus via microbore; and/or
3. both tubing and microbore simultaneously, if required.

The use of what is termed 'dual completions' is well-known where two tubing strings are run in the same well. Normally this is done to keep production separated from two different reservoirs in the same well. However, the Inventors propose using microbore going through a feedthrough, and when the microbore size is increased to say 2⅜" upwards, the configuration would revert to standard dual completion wellhead geometry. In standard dual well geometry both strings can be used as fluid level measurement conduits.

One or more embodiments of the present invention can provide a potential solution to problems in the prior art. The one or more embodiments can provide such by running a tube, e.g. small bore tube (SBT), ('big' ID control line) in an annulus and utilising down tubing transmission technology, e.g. Frequency Domain Reflectometry (FDR) technique down the SBT (which typically has an ¼" to ¾" internal diameter). One can run a control line below the pump-off depth. The fluid level in the annulus will level with fluid level in the SBT to give a fluid depth.

The invention claimed is:

1. An apparatus for detecting a downhole feature in a well having a wellbore, the apparatus comprising:
    an electromagnetic antenna comprising a receiver; and
    a first tube provided in a casing of the wellbore, wherein the first tube comprises an at least partially porous or perforated wall or side wall which is fluid and/or liquid permeable, and wherein the first tube comprises a first waveguide.

2. An apparatus as claimed in claim 1, wherein:
    the well is an oil, gas or water well, and
    the well is a production, injection/artificial lift, completed/sealed/pressurised, observation, injection or disposal well.

3. An apparatus as claimed in claim 1, wherein the at least partially porous or perforated wall or side wall comprises plurality of pores, micropores, holes or slots.

4. An apparatus as claimed in claim 1, wherein the first tube comprises a polymeric or plastics material or a metallic material.

5. An apparatus as claimed in claim 1, wherein the apparatus comprises a second tube which is fluid and/or liquid impermeable comprising a solid, non-porous or non-perforated side wall.

6. An apparatus as claimed in claim 5, wherein the second tube comprises a polymeric or plastics material or a metallic material.

7. An apparatus as claimed in claim 5, wherein an upper or downstream end of the first tube is attached to or connected to a lower or upstream end of the second tube.

8. An apparatus as claimed in claim 5, wherein at least one of the first tube and the second tube is reelable or spoolable.

9. An apparatus as claimed in claim 1, wherein:
    the first tube is hollow, and
    the apparatus comprises a second tube which is hollow, and the second tube comprises a second waveguide.

10. An apparatus as claimed in claim 1, wherein:
    the first tube and a second tube are connected via a connector; and
    the apparatus comprises a plurality of first tubes and respective second tubes, and
    each first tube is adapted such that a downhole end thereof is at a different level or depth to a downhole end of the/each other first tube, and
    the first tubes and second tubes are provided within an outer sheath or conduit.

11. An apparatus as claimed in claim 1, wherein:
    a second tube comprises a second waveguide; and
    a connector comprises a further waveguide.

12. An apparatus as claimed in claim 1, wherein:
    the first tube has a substantially circular cross-section; and
    a second tube has a substantially circular cross-section.

13. An apparatus as claimed in claim 1, wherein:
    the first tube is provided downhole of a second tube;
    the second tube extends substantially from or through a wellhead or Christmas tree;
    the apparatus is provided in a wellbore of the well in an annulus between a wellbore casing and production tubing;
    an electromagnetic signal is propagated within the second tube to within the first tube; and
    a partial reflection of the electromagnetic signal occurs at the connector or joint between the first tube and the second tube so as to provide a reference level or datum point.

14. An apparatus as claimed in claim 1, wherein the electromagnetic antenna is connected to another or upstream end of a second tube, and wherein
    the electromagnetic antenna comprises a transmitter.

15. An apparatus as claimed in claim 14, wherein, in use, in a transmission path, an electromagnetic signal propagates from the transmitter through the second tube, the second tube extends through the wellhead and/or the Christmas tree, in said transmission path, the electromagnetic signal propagates through a connector, in said transmission path the electromagnetic signal propagates through the first tube until a fluid/fluid interface(s) is met, at said fluid/fluid interface the electromagnetic signal is at least partially reflected, the reflected electromagnetic signal then propagating through the first tube, the connector, and the second tube in a received path, the reflected signal being received by the receiver, and
    the electromagnetic signal comprises a microwave signal, a millimetre or radio signal; and
    the electromagnetic signal comprises a TE-nn, TEnn or TEMnn mode.

16. A well comprising a wellbore casing and an apparatus for detecting a downhole feature in the well as claimed in claim 1.

17. A well as claimed in claim 16, wherein the well comprises:
    a completed/sealed/pressurised well;
    a wellbore casing;
    a production tubing;
    a wellhead;
    a Christmas tree; and
    the apparatus extends within the well; and further wherein:
    a second tube extends through the wellhead/Christmas tree; and/or
    the second tube acts as a second production or injection conduit.

18. A tube when used as a first tube of the apparatus of claim 1.

19. A method of detecting at least one downhole feature in a well, the method comprising:
    providing an apparatus according to claim 1 within a wellbore of the well;
    transmitting from a transmitter an electromagnetic signal within the apparatus;
    reflecting at least part of the electromagnetic signal from the at least one downhole feature;
    receiving the at least part of the electromagnetic signal at a receiver.

20. A method as claimed in claim 19, wherein:
    the transmitter and the receiver are provided external of the wellbore;
    the downhole feature comprises a fluid/fluid interface; and the method comprises the step of sealing the well prior to the step of transmitting the electromagnetic signal.

* * * * *